US006058314A

United States Patent [19]

Seok et al.

[11] Patent Number: 6,058,314

[45] Date of Patent: May 2, 2000

[54] APPARATUS AND METHOD FOR CONNECTION AND DATA TRANSFER BETWEEN BASE STATION MANAGING DEVICES AND A NETWORK MANAGEMENT CENTER

[75] Inventors: Kyung-Hyup Seok; Gee-Hyoung Sang, both of Seoul, Rep. of Korea

[73] Assignee: Samsung Electronics Co., Ltd., Rep. of Korea

[21] Appl. No.: 08/909,111

[22] Filed: Aug. 11, 1997

[30] Foreign Application Priority Data

Aug. 9, 1996 [KR] Rep. of Korea ...................... 96-33240

[51] Int. Cl.[7] ........................................................ H04B 7/24

[52] U.S. Cl. ......................... 455/507; 455/67.1; 455/424; 455/560

[58] Field of Search .................................... 455/560, 507, 455/508, 422, 423, 424, 9, 67.1, 67.3, 67.7

[56] References Cited

U.S. PATENT DOCUMENTS

| | | | |
|---|---|---|---|
| 5,285,494 | 2/1994 | Sprecher et al. | 455/508 |
| 5,297,193 | 3/1994 | Bouix et al. | 455/560 |
| 5,396,543 | 3/1995 | Beeson et al. | 455/560 |
| 5,737,359 | 4/1998 | Koivu | 455/424 |

*Primary Examiner*—Lee Nguyen
*Attorney, Agent, or Firm*—Dilworth & Barrese

[57] ABSTRACT

A method of connection and data transfer between at least one base station managing device and a network management center of a radio communications system comprises the steps of: (a) gathering data in accordance with formats required by the network management center at the at least one base station managing device; (b) generating a process of a corresponding format at the base station managing device; (c) notifying identification information of the process generated at the at least one base station managing device; (d) driving a subprocess according to the process identification information at the at least one base station managing device; and (e) transmitting the corresponding formatted data to the network management center.

6 Claims, 2 Drawing Sheets

APPARATUS AND METHOD FOR CONNECTION AND DATA TRANSFER BETWEEN BASE STATION MANAGING DEVICES AND A NETWORK MANAGEMENT CENTER

BACKGROUND OF THE INVENTION

1. Field of the Invention

The present invention relates to apparatus and methods of intensively managing various situations associated with a plurality of base station systems and various forms of generated data.

2. Description of the Related Art

Generally speaking, a radio communications system is formed in cellular mode, in which base stations are installed in units of predetermined cells, the base stations each performing radio communications between mobile stations located in a corresponding cell area. It is assumed in this invention that the radio communications system uses code division multiple access (CDMA) mode. In CDMA, a plurality of base station transceiver subsystems (BTS) are installed in units of cells, and various states of the base station modules and various forms of data generated therefrom are required to be managed. For this purpose, the CDMA employs a remotely located network management center.

SUMMARY OF THE INVENTION

An object of the present invention is to provide apparatus and methods of transmitting various pieces of information by connecting a base station manager (BSM) for managing base station systems and a network management center in a radio communications system.

In one aspect of the present invention, a method of connection and data transfer between at least one base station managing device and a network management center of a radio communications system comprises the steps of: (a) gathering data in accordance with formats required by the network management center at the at least one base station managing device; (b) generating a process of a corresponding format at the base station managing device; (c) notifying identification information of the process generated at the at least one base station managing device; (d) driving a subprocess according to the process identification information at the at least one base station managing device; and (e) transmitting the corresponding formatted data to the network management center.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

Figure 1:
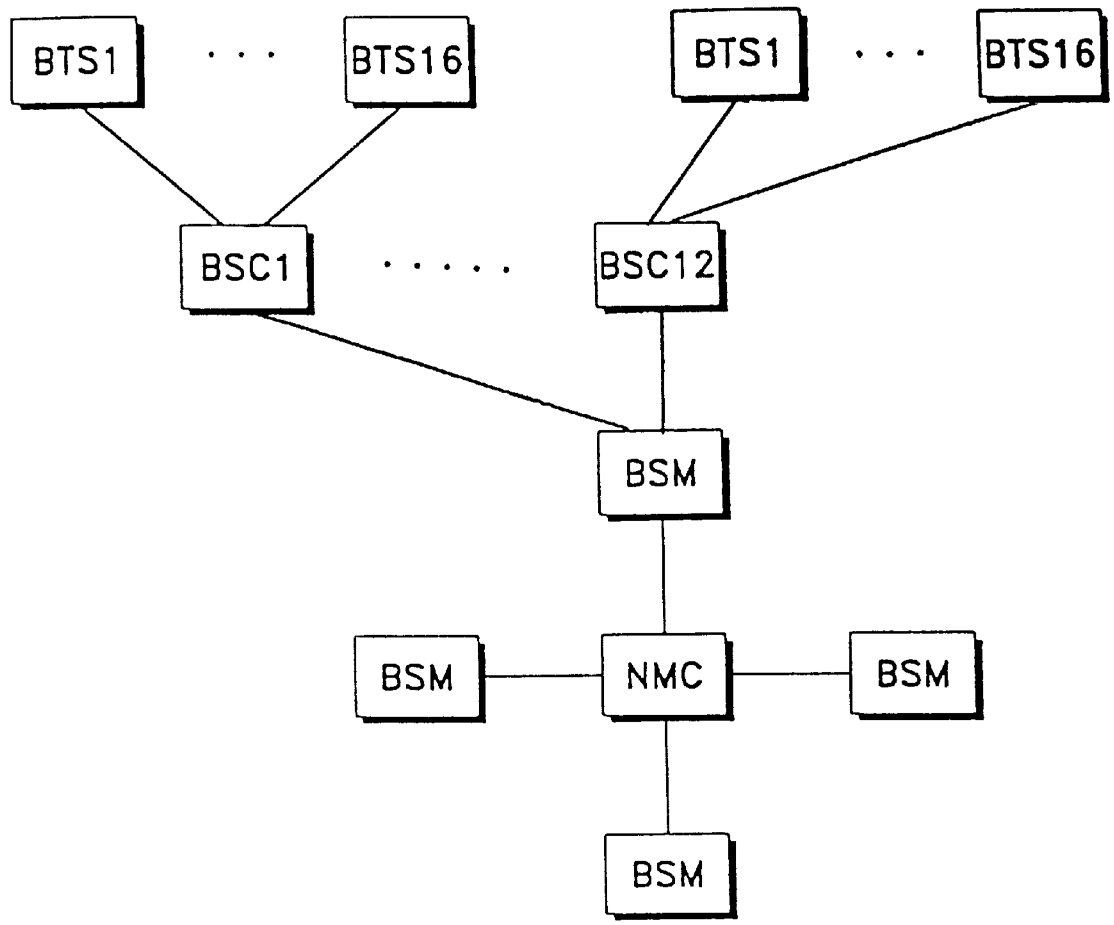
FIG. 1 is a block diagram illustrating a preferred configuration of a radio communications system including apparatus for performing features of the present invention.

Referring to FIG. 1, a base station transceiver subsystem (BTS) performs a function of transmitting a radio signal. A BTS controller (BSC) is a device for controlling the BTS, one BSC controlling 16 BTSs. BSM (base station manager) is a device for controlling the BSC, one BSM controlling 12 BSCs. A network management center (NMC) is connected to the BSMs to perform a function of intensively managing the base stations remotely.

Figure 2:
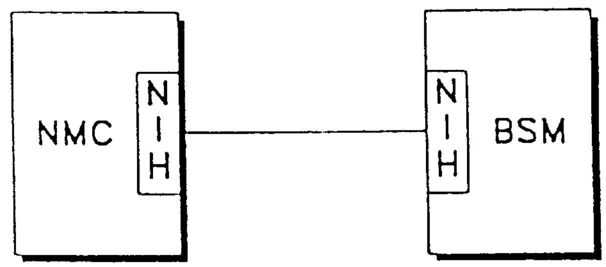
FIG. 2 is a block diagram illustrating the connection between a network management center and a base station managing devices according to the present invention.

The NMC is connected to a plurality of BSMs via cables. As shown in FIG. 2, the NMC and BSM are connected via a network interface handler (NIH). The NMC and BSMs are formed in a local area network (LAN), in which the communications mode is SOCKET.

Figure 3:
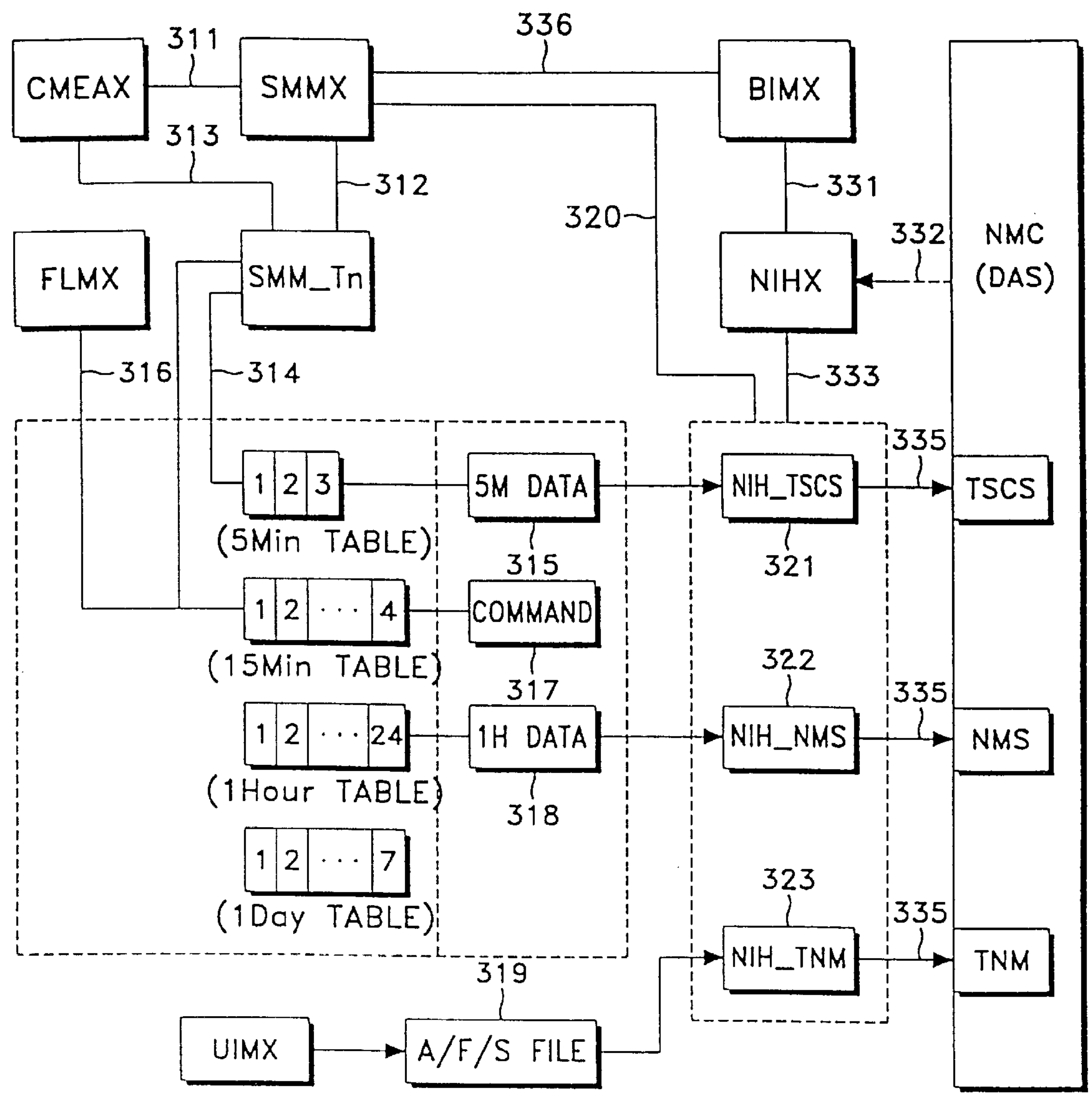
FIG. 3 is a block diagram/flow chart illustrating a signal processing operation between a base station system and a network management center according to the present invention.

The NIH block has a function of transmitting data such as control/trouble status data generated from the BSM, to the NMC, operation maintenance center (OMC). The data is processed while being divided into real-time traffic data (five-minute period statistic), one-hour period control data, and trouble/status data. Referring now to FIG. 3, a block diagram/flow chart illustrating the function performed by and between the BSM and the NMC utilizing the NIH block is shown. The abbreviated words used in FIG. 3 are listed below:

NIH: network interface handler

CMEAX: call control processor measurement management

SMMX: statistic measurement manager

BIMX: BSM initialization & maintenance

FLMX: fault manager

NMC: network management center

UIMX: user interface manager

A/F/S file: alarm/fault/status file

The statistic related data provided from the SMMX, a statistic processing block, are accepted by the NIH and transmitted to the operation maintenance center. The trouble/status related data stored in a history file by the system message processing block of the UIMX by jobs and time are read in real time and then transmitted to the operation maintenance center.

The NIH block, forked by the BIMX, is constituted by a parent process for forking a child process after receiving the connect message from the NMC, the client, and three child processes for communicating with the NMC by message types. The parent process of the NIH normally waits for the connect message, the child processes maintaining the connection status until the close message is received.

According to the operation of the present invention referring to FIG. 3, the CMEAX tries initialization for CCP statistic data reporting in a predetermined period, e.g., 5 or 15 minutes (311).

The SMMX generates a child process for gathering CCP statistic data (312). The IPC is carried out between the CMEAX and the SMMX so as to gather the statistic data (313). The SMM_Tn separately stores and manages the real-time traffic data and the 15-minute period statistic data in the period of 5 minutes (314), and produces a 5-minute real-time traffic data file. The 5-minute data is data to be transmitted to the TSCS of the NMC. This file is overwritten when new data is collected (315). The FLM library-calls the trouble data in the 15-minute table by the factor of time (316). A 15-minute period statistic data file is produced only when a statistic command is registered (317). The one-hour period statistic data file is generated to be transmitted to the NMS of the NMC. This file is overwritten when new data is gathered in one hour (318). The system message processing function block of the UIMX writes alarm, fault, status data in a history file by jobs and time (319). The SMMX informs the NMC that the file for transmitting the 5-minute real-time traffic data and one-hour period statistic data is completely made. The SMMX permanent process transmits a signal to a corresponding process.

In this case, the ID of the corresponding process must be informed previously when forked to the NMC according to the NIHX's control. If the SMMX permanent process is restored, NIHX should be able to report process ID of TSCS and NMS to the BIMX and the BIMX via the SMMX (320). The NIHX controls the NIH, and receives the signal via the SMMX so as to transmit the 5-minute period real-time traffic data to the NMC. Then, the NIHX reads the 5-minute period real-time traffic data file, which is transmitted to the TSCS (321). After receiving the signal via the SMMX for the purpose of the one-hour period statistic data transmission to the NMC, one-hour period statistic data file is read and transmitted to the NMS (322). The system messages (alarm, fault, status) are read from the history file, and then transmitted to the TNM. In this situation, they should be read continuously in real time without any event (323).

The BIMX forks a daemon process for socket, and the daemon process is changed to a waiting mode for receiving the connect message required in link set-up from the NMC. After receiving the connect message, a child PID in accordance with the forking of the child process is reported to the BIMX (331). The NMC, the client, transmits the connect message with the logic port ID (temporary port ID:300x). The IP address and host name must be defined in advance [\etc/hosts] (332). The child processes by message formats (TSCS, NMS, TNM) are forked to set connection (333). The statistic TSCS, NMS processes indicate their own PID to the SMMX permanent process (334). The TNM transmits data to the OMC in real time, and the TSCS and NMS do so according to the signal generated at 320 (335). If the SMMX permanent process is restored, the BIMX passes the TSCS and NMS process PID to be used in the transmission of the signal at 320 (336).

In short, the NMC asks the NIHK for various types of data. Here, the data includes 5-minute data, one-hour data, and A/F/S data. Then, the NIHX produces a corresponding process which drives the NIH. The NIHX reports the process ID generated to the BIMX. The BIMX outputs the corresponding process ID to the SMMX. The SMMX drives a corresponding SMM subprocess to transmit corresponding data to the NIH. The data transmitted from the NIH is output to the NMC. As a result, remote data input as above is intensively managed to control the operation status of base stations.

As described above, the present invention efficiently performs operation and maintenance of a radio communications system by transmitting all kinds of data for system management and operation including statistic, status and trouble data of the remote base stations to the NMC thus allowing the NMC to intensively manage information transmitted.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of connection and data transfer between at least one base station managing device and a network management center of a radio communications system, the method comprising the steps of:

(a) gathering data in accordance with formats required by the network management center at the at least one base station managing device;

(b) generating a process of a corresponding format at the base station managing device;

(c) notifying identification information of the process generated at the at least one base station managing device;

(d) driving a subprocess according to the process identification information at the at least one base station managing device;

(e) periodically transmitting the corresponding formatted data to a network interface handler interfacing the at least one base station managing device with the network management center; and (f) periodically transmitting the corresponding formatted data from the network interface handler to the network management center upon transmission of at least one control signal to the network interface handler.

2. The method of claim 1, wherein the data transferred between the at least one base station managing device and the network management center is one of real-time traffic data, period control data and trouble/status data.

3. The method of claim 1, wherein the network management center utilizes the data transferred thereto from the at least one base station managing device in order to control the operation status of the at least one base station managing device.

4. Apparatus for connection and data transfer between at least one base station managing device and a network management center of a radio communication system, the apparatus comprising:

means for gathering data in accordance with formats required by the network management center at the at least one base station managing device;

means for generating a process of a corresponding format at the base station managing device;

means for notifying identification information of the process generated at the at least one base station managing device;

means for driving a subprocess according to the process identification information at the at least one base station managing device;

means for periodically transmitting the corresponding formatted data to a network interface handler interfacing the at least one base station managing device with the network management center; and means for periodically transmitting the corresponding formatted data from the network interface handler to the network management center upon transmission of at least one control signal to the network interface handler.

5. The apparatus of claim 4, wherein the data transferred between the at least one base station managing device and the network management center is one of real-time traffic data, period control data and trouble/status data.

6. The apparatus of claim 4, wherein the network management center utilizes the data transferred thereto from the at least one base station managing device in order to control the operation status of the at least one base station managing device.

* * * * *